(12) United States Patent
McAfee et al.

(10) Patent No.: US 9,664,508 B2
(45) Date of Patent: May 30, 2017

(54) PORTABLE OPTICAL METROLOGY INSPECTION STATION AND METHOD OF OPERATION

(75) Inventors: Scott T. McAfee, Jensen Beach, FL (US); William J. Greene, Juno Beach, FL (US)

(73) Assignee: Level 3 Inspection, LLC, Stuart, FL (US)

( * ) Notice: Subject to any disclaimer, the term of this patent is extended or adjusted under 35 U.S.C. 154(b) by 1264 days.

(21) Appl. No.: 13/467,546

(22) Filed: May 9, 2012

(65) Prior Publication Data

US 2012/0290259 A1 Nov. 15, 2012

Related U.S. Application Data

(60) Provisional application No. 61/484,016, filed on May 9, 2011.

(51) Int. Cl.
*G01B 21/04* (2006.01)
*G01B 11/24* (2006.01)

(52) U.S. Cl.
CPC .......... *G01B 11/24* (2013.01); *G01B 21/047* (2013.01)

(58) Field of Classification Search
CPC .................................................. G01B 21/047
See application file for complete search history.

(56) References Cited

U.S. PATENT DOCUMENTS

| | | | |
|---|---|---|---|
| 5,884,935 A * | 3/1999 | Tholkes | 280/657 |
| 5,941,621 A * | 8/1999 | Boulay | A47B 88/044 |
| | | | 248/906 |
| 6,157,450 A | 12/2000 | Marchese-Ragona et al. | |
| 6,532,064 B1 | 3/2003 | Hearn et al. | |
| 6,917,421 B1 | 7/2005 | Wihl et al. | |
| 7,436,522 B2 | 10/2008 | Steinbichler et al. | |
| 8,249,823 B2 * | 8/2012 | White et al. | 702/151 |
| 2002/0015054 A1 * | 2/2002 | Hibino | 345/677 |
| 2002/0057438 A1 | 5/2002 | Decker | |
| 2002/0099456 A1 * | 7/2002 | McLean | 700/83 |
| 2002/0156597 A1 * | 10/2002 | Kornowski, Jr. | G01B 21/04 |
| | | | 702/179 |
| 2003/0063084 A1 * | 4/2003 | Burke | 345/419 |
| 2006/0184296 A1 * | 8/2006 | Voeller et al. | 701/33 |
| 2007/0268540 A1 | 11/2007 | Gaspardo et al. | |
| 2009/0080036 A1 | 3/2009 | Paterson et al. | |

(Continued)

*Primary Examiner* — Bryan Bui
(74) *Attorney, Agent, or Firm* — McHale & Slavin, P.A.

(57) ABSTRACT

An integrated automated 3D Optical Scanning and Computer Aided Inspection System for dimensional inspection of precision manufactured parts. The system is based within a portable cabinet having lockable caster wheels for portability and retractably support feet for enhanced stability. The cabinet further includes a part placement area having an optical metrology scanner positioned over a multi-axis robotic arm positioned in the part placement area. The robotic arm is constructed and arranged to grip and manipulate parts within a field of view of the optical metrology scanner. The robotic arm provides multi-axis to rotate and tilt a base to allow substantially every surface of the part to be scanned. Dimensional comparison and analysis software application provide geometric conformance/deviation plus extraction of the dimensions indicated in the part computer aided design (CAD) model.

13 Claims, 6 Drawing Sheets

(56) References Cited

U.S. PATENT DOCUMENTS

| | | |
|---|---|---|
| 2010/0149534 A1 | 6/2010 | White et al. |
| 2010/0154934 A1* | 6/2010 | Hatch, Jr. ............... B27C 9/04 144/363 |

* cited by examiner

PORTABLE OPTICAL METROLOGY INSPECTION STATION AND METHOD OF OPERATION

CROSS REFERENCE TO RELATED APPLICATIONS

This application claims the benefit of priority of U.S. Provisional Patent Application No. 61/484,016, filed May 9, 2011, entitled "Portable White Light Scanning Inspection Station and Method of Operation", the entire contents of which is hereby expressly incorporated by reference.

FIELD OF THE INVENTION

The invention is directed to the field of 3D Optical Metrology, including White Light Scanning, and in particular to an integrated, automated 3D Optical Scanning and Computer Aided Inspection System for faster dimensional inspection of precision manufactured parts.

BACKGROUND OF THE INVENTION

Manual 3D digitization, commonly known as Optical Scanning, uses equipment and software including full-spectrum optical metrology, limited spectrum (e.g. Light Emitting Diode), and LASER. Typically, a human either places and positions the part in front of the sensor or moves both the part and the sensor to allow surface digitization of the part surface. This is followed by manual transfer of the scan file onto a post-processing Computer Aided Inspection engineering workstation, where the file is opened in a dimensional comparison and analysis software application. Geometric conformance and deviation are found, and the dimensions indicated in the part computer aided design (CAD) model and/or blueprint are extracted. This information can be reported either in a pass/fail determination report, a partial dimensional inspection report, or a complete dimensional inspection report for subsequent evaluation and part quality determination, as well as manufacturing process optimization.

The Applicant, considered an expert in the industry, has been performing Computer Aided Inspection for 12 years on turbine engine components and medical device components, among many other manufactured parts and products, with the most sophisticated equipment available, mostly based on the use of a tripod-mount or T-mount based 3D Optical Scanner. When operated manually, this 3D surface digitizing system can be used to scan objects of nearly any size. Moving the scanner manually from location to location around the part in order to address all of the part surfaces for visual access and digitizing is a slow and methodical operation. Scanning-processing speed can be increased to a limited extent by use of a 1-axis rotary or 2-axis tilt and rotary tables to move the part in concert with the movement of the scanner.

Other Optical Scanner systems attempt to move the scanner sensor with basic manipulators around the part being scanned. Still other systems have placed the sensor on a traditional pedestal (floor-mounted) robot with the part being scanned on a rotary table. These systems have been plagued with vibration problems and sensor and/or part movement, severely reducing the accuracy and usefulness of the scan data. Gauge Repeatability and Reproducibility (Gauge R&R) studies, as well as inspection results, have shown these problems to be systemic and to result from poor stability of the sensor and part manipulators. Currently the manual operation of a computer aided inspection workstation requires a highly qualified technician to assure proper part placement in relation to the optical scanner.

Typical Optical Scanner output is a point-cloud or polygonized-mesh file that is post-processed either on the scanner computer or, preferably, on a separate workstation computer that does not occupy and consume the scanner computer capacity. Post-processing is the step that generates the typical illustration, analysis, inspection, and report functions of the Computer Aided Inspection process. This is usually performed in two separate sequential steps.

U.S. Pat. No. 7,436,522 to Steinbichler et al., discloses a method to determine the 3D coordinates of the object. The 3D coordinates of a partial surface of the object are determined by a 3D scanner which includes one or more detectors and whose position is determined by a tracking device. The 3D coordinates of an adjacent partial surface of the object are determined by the 3D measuring device. The 3D coordinates of an overlap region of the adjacent partial surfaces are put together by a matching method merging individual scans in a manner so that stacking errors are kept to a minimum.

U.S. Pat. No. 6,917,421 to Wihl, is directed to systems and methods for assessing a dimension of a feature of an object. The system includes an illumination system configured to scan a specimen with light at multiple focal planes substantially simultaneously with multiple collectors. Nearly all light returned from one of the multiple focal planes may be collected by one of the collectors. In addition, the system may include a processor configured to assess dimension of a feature in a direction substantially perpendicular to an upper surface of the specimen using the relative intensity.

U.S. Pat. No. 6,532,064 to Hearn et al., is directed to an automated inspection apparatus for detection of anomalies in a 3D translucent object. The apparatus has a scan head assembly including an image processing unit and image capture device, a first and second light source, and a conveyor. The disclosure is directed to a light block member positioned along a substantially common axis of the image capture device and a light source.

U.S. Published Patent Application Number 2002/0057438 to Decker, is directed to a method and apparatus for acquiring surface topography. The surface topography is acquired by illumination sources with patterns of light from one optical perspective, and the light reflected off the surface is captured by image sensors from an optical perspective that is different than the perspective of the illumination. The images obtained are of the surface with one or more patterns superimposed upon the surface. The surface topography is computed with a processor based upon patterned image data, the known separation between the illumination sources and the imaging sensors, and knowledge about how the patterns of light are projected from the illumination sources.

U.S. Published Patent Application Number 2009/0080036 to Paterson et al., is directed to a scanner system and method that includes a scanner device, a target, and a processor. The scanner device includes an emitter for projecting patterned light and a sensor for capturing images of the object. The target has predetermined features visible to the sensor simultaneously with the object to allow the processor to determine the location of the sensor with respect to the object. This generates a three-dimensional model of the object with the patterned light projected thereon. The scanner further includes light sources for directionally illuminating the object and a sensor is arranged to capture images of the illuminated object. The processor generates sets of photometric data for the object when illuminated from different directions. The processor combines the geometric data and photometric data to output a model comprising geometric information on the object together with photometric information spatially registered with the geometric information.

What is needed, in the art, is a portable system, and also a method of obtaining the accurate and comprehensive dimensional inspection results that are available from 3D scanning with optical metrology and computer aided inspection, while reducing or even removing operator handling to eliminate human induced errors along with the associated lost time to processing steps when a system does not employ seamless and integrated components, especially in a standalone automated system.

SUMMARY OF THE INVENTION

An integrated automated 3D Optical Scanning and Computer Aided Inspection System for dimensional inspection of precision manufactured parts. The system is based upon a portable frame having lockable caster wheels for portability and retractable support feet for enhanced stability. When and if needed, the support feet can be enhanced with vibration dampening cushions or bearings to isolate the system from the floor carrying the vibration. The frame includes a part placement area with an optical metrology scanner positioned over a multi-axis robotic arm parts presenter positioner with a gripper in the part placement area, the gripper being specific to the part. The robotic arm is constructed and arranged to grip and manipulate parts within a field of view of the optical metrology scanner. The robotic arm provides multi-axis rotate and tilt maneuverability to allow substantially every needed surface of the part to be scanned with no or minimal human intervention. A computer controller mounted in the frame is electrically coupled to the scanner and robotic arm and creates a scan file for batch-processing an analysis, inspection and reporting operation on a part, or series of part scans. Dimensional comparison and analysis software provides geometric conformance/deviation plus extraction of the dimensions indicated in the CAD model and/or blueprint, and any desired inspections are compared in three dimensions. A pass/fail determination, a partial dimensional inspection report, or a complete dimensional inspection report is generated to meet the requirements. This invention is a unique design and a breakthrough in fast, automated, comprehensive, and accurate dimensional quality inspection capabilities.

In addition to the primary benefits of measurement accuracy and comprehensiveness that Optical Scanning & computer aided inspection provide, additional advantages are: faster inspection; easier disposition; user/operator readiness; manufacturing shop-floor applicability; and other process, application, and operational advantages.

An objective of the instant invention is to provide an Inspection Station that can near-completely digitize the desired surfaces of various sizes of complex and/or precision manufactured parts in very few minutes, and perform simultaneously, sequentially or in parallel, the post-processing analysis and inspection operations, automatically, on the same standalone system. Sequence of process operations includes: Human or mechanical system places part(s) to be inspected in a part presenter positioner having a gripper specific to the part for holding the part securely while the parts presenter positions part(s) in the field of view of the 3D camera/scanner. Pull-down menu or other means to select the part-specific inspection routine, data entry or bar-code scan launch of the scan, then alignment to CAD model, and inspection processes in the automated CAI routine. Measurement and analysis programming can be delivered pre-installed for any level of measurement and can be remotely updated or added over time by Smart Inspection Systems via the Internet, if allowed. Inspection report output can be highly variable, ranging from simple pass/fail determination to full dimensional inspection including geometric dimensioning and tolerancing (GD&T), as described in the associated part engineering design or inspection drawing.

Another objective of the instant invention is to provide an Inspection Station that is configurable with variable or interchangeable components including sensors, field of view lenses, parts grippers, parts presenters, software applications, controllers and computers. These components allow multiple standard and custom system configurations to accommodate a reasonably wide range of part sizes, complexities, quantities, dimensional tolerances, scan data point density, inspection process speeds and analysis output formats. Files can range from simple scan files, to pass/fail reports (even with green/red lights) through complete dimensional inspection reporting and integrating/delivering inspection output information directly into enterprise statistical process control (SPC) and other enterprise/quality/production management systems.

Other objectives and advantages of this invention will become apparent from the following description taken in conjunction with the accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

The invention is an integrated, automated Optical Metrology 3D Scanner, Parts Presenter, and Computer Aided Inspection system that receives a part and rapidly performs all of the process steps required to create the desired inspection outcome determination with varying levels of trendable, traceable, trackable results reporting for part disposition, process optimization, quality control, production stage monitoring, and Statistical Process Control, among other benefits, all with minimal non-technical operator effort beyond inserting the part(s) to be inspected and selecting 'Start'. This inspection part insertion can also readily be automated to completely eliminate human operators.

Figure 1:
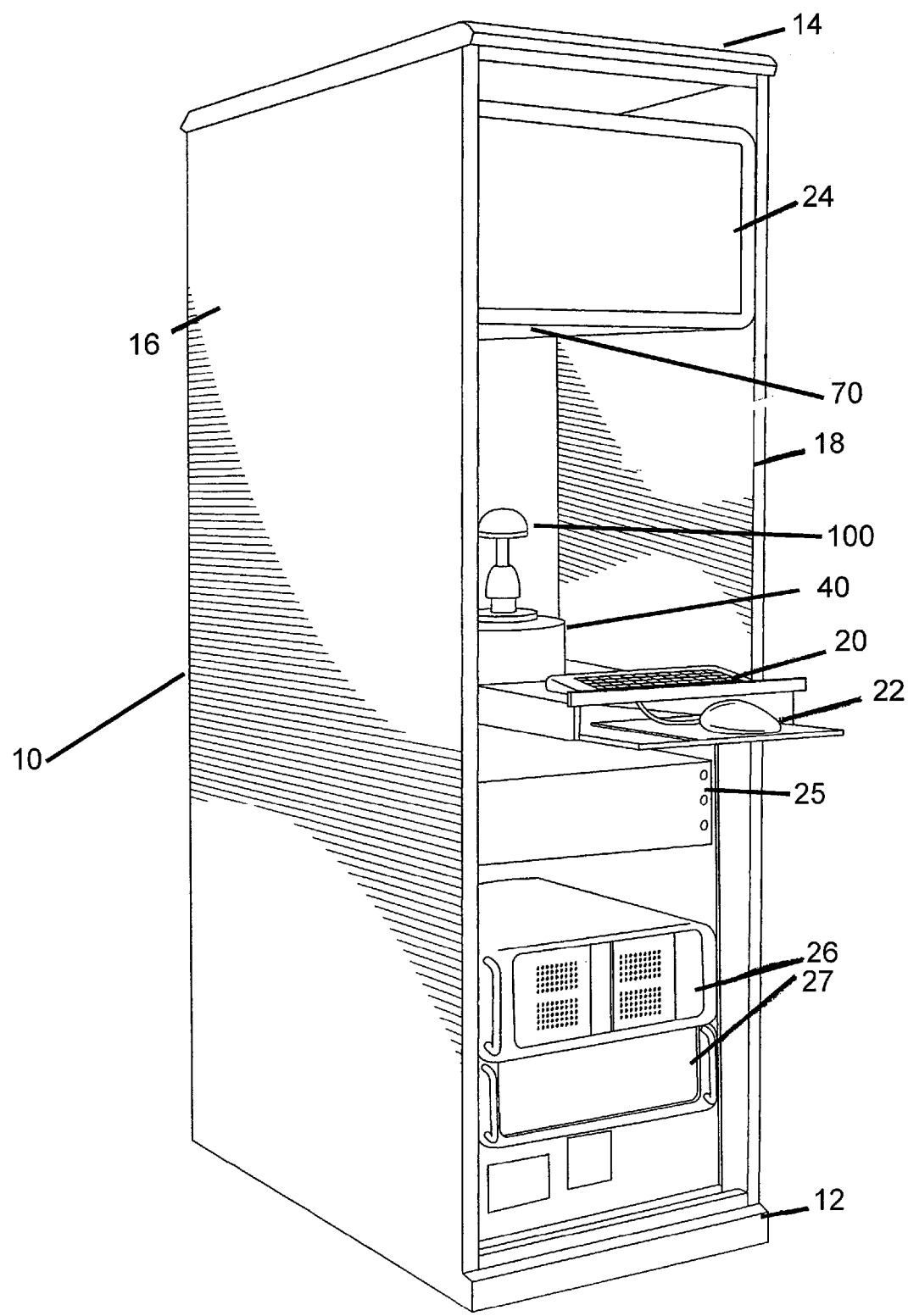
FIG. 1 is a perspective view of the inspection station.

Referring now to FIG. 1, set forth is a pictorial view of the inspection station 10 which is specifically designed to consume a small footprint having a base 12, a top 14, and two side walls 16, 18. The side walls 16 and 18 of the inspection station are constructed and arranged to provide rack style mounting of components allowing ease of assembly, repair and configuration. The operation of the inspection station is controlled by a specialized computer 26, the computer includes parallel-processing, hyper-threading with multiple processors and a very fast bus speed. The computer includes a large amount of RAM, advanced graphical processing units (GPU) and substantial storage drives preferably with network access. A conventional keyboard 20 and cursor controller 22 are coupled to the computer 26 with display images projected onto the display screen monitor 24. A 3D optical camera/scanner is positioned above a parts presenter positioner 40. The optical scanner digitizes the desired surfaces of the part and performs simultaneously, sequentially or in parallel, the post-processing analysis and inspection operations, automatically on the same stand alone system. The part to be inspected is securely positioned within the parts presenter positioner 40 with a gripper that is specific to the part, the parts presenter positioned is rotated in the field of view of the 3D camera/scanner. Pull-down menus displayed on the screen monitor 24 are used to track and initialize the part-specific inspection routine by allowing data entry or bar-code scan launch of the scan, alignment to CAD model, and inspection processes within an automated CAI routine. The inspection report output can be highly variable, ranging from simple pass/fail determination to full dimensional inspection including geometric dimensioning and tolerancing (GD&T), as described in the associated part engineering design or inspection drawing. The inspection station 10 is configurable with interchangeable components including sensors, field of view lenses, alternate parts grippers and parts presenters, software applications, controllers and computers.

The workstation is preferably a single strong industrial server-style cabinet, complete with an uninterruptable power supply (UPS) and optional air conditioner, if needed in the operating environment, may include lockable doors allowing only authorized access to any particular part of the system, and may be mounted on locking casters for system mobility. The system includes cabinet stability when situated for inspection operations and the simplicity of a single power-plug for operations, plus Ethernet network connection for data and report transfer and off-loading from the system.

The optical metrology scanner employed is an optical three-dimensional geometric measuring system which is based on the principle of triangulation. To create the object surface digital model, a structured light source is used to project controlled fringe or raster patterns on the object. These fringe patterns and their motion across the part surface are recorded as high resolution images with digital cameras. The data collected by these cameras is used to create a highly accurate and precise image of the object's entire surface. While contact measurement systems and devices provide a small set of landmark measurements on the object, optical metrology three-dimensional scanning can completely capture the entire surface of any 3D object. The scanner is capable of picking up tens of thousands of data points per second, and the highly automated process ensures consistency and quality. This highly accurate complete three-dimensional digital model is then compared to the object's original CAD model, and any geometric variation between the two is vividly shown in "color plots" with adjustable tolerance ranges as well as complete tables of measurement and deviation numbers. The increased ease of interpretation and understanding from these color plot reports is one of the key advantages of this method of geometric measurement and quality analysis. This process enables quick and accurate product inspection, such as prior to production implementation, or after periods of extended use and/or product remanufacture and so on. A comparative analysis of the CAD model to the actual product permits identification of imperfections. In addition, because optical metrology three-dimensional scanning is a nondestructive analysis that encompasses the entire object, it is possible to reverse engineer the object based on the data collected during the scanning process. This allows the remanufacture of parts for which there are no CAD data. Optical metrology scanning is an important tool in the design and development of products, the tooling and fixturing for manufacture and the inspection of the product at any point in its life cycle.

Figure 2:
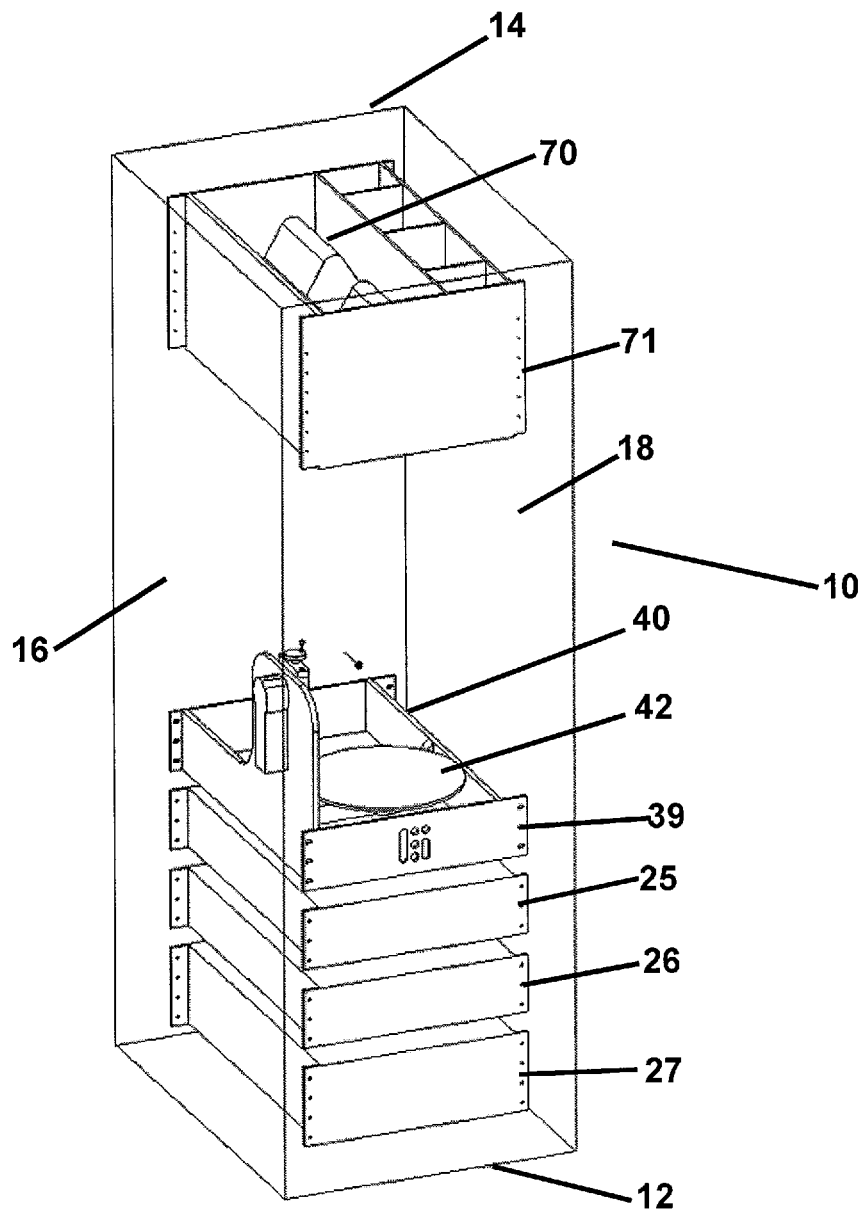
FIG. 2 is a perspective cross sectional view of an inspection station illustrating component reconfiguration.

An example part 100 is shown on the parts presenter positioned 40 held by a gripper for processing. An operator controls the inspection station by use of the keyboard and mouse, responding to queries provided on the display screen 24. The parts presenter positioner positions the part 100 in accordance with computer issued instructions wherein the optical scanner 70 initiates the scan for comparison to the predetermined part parameters. Shown in FIG. 2, set forth is an illustration of the inspection station 10 which is constructed and arranged to house components by use of removable racks. A keyboard tray and mouse can be positioned on an upper rack 25. The computer 26 can be rack mounted as depicted beneath the upper rack 25 and a sensor/robotic controller is rack mounted as depicted by numeral 27. The optical scanner 70 is held about the parts presenter positioner within rack 71. The parts presenter positioner 40 is at least a two axis robotics assembly, and may be a three or four axis robotic assembly having a base 42 positionable beneath the optical scanner 70. The parts presenter positioner 40 is shown secured to a rack 39 allowing for ease of configuration.

The parts presenter positioner rack allows for interchangeable components including sensors, parts grippers, and parts presenters allowing multiple standard and custom system configurations to accommodate a reasonably wide range of part sizes, complexities, quantities, dimensional tolerances, scan data point density, inspection process speeds and analysis output formats. A part placed within the parts presenter positioner is scanned for dimensional comparison and analysis using preprogrammed software applications where geometric conformance/deviation plus dimensional extraction of those dimensions indicated in the part computer aided design (CAD) model and Blueprint are compared in three dimensions.

Figure 3:
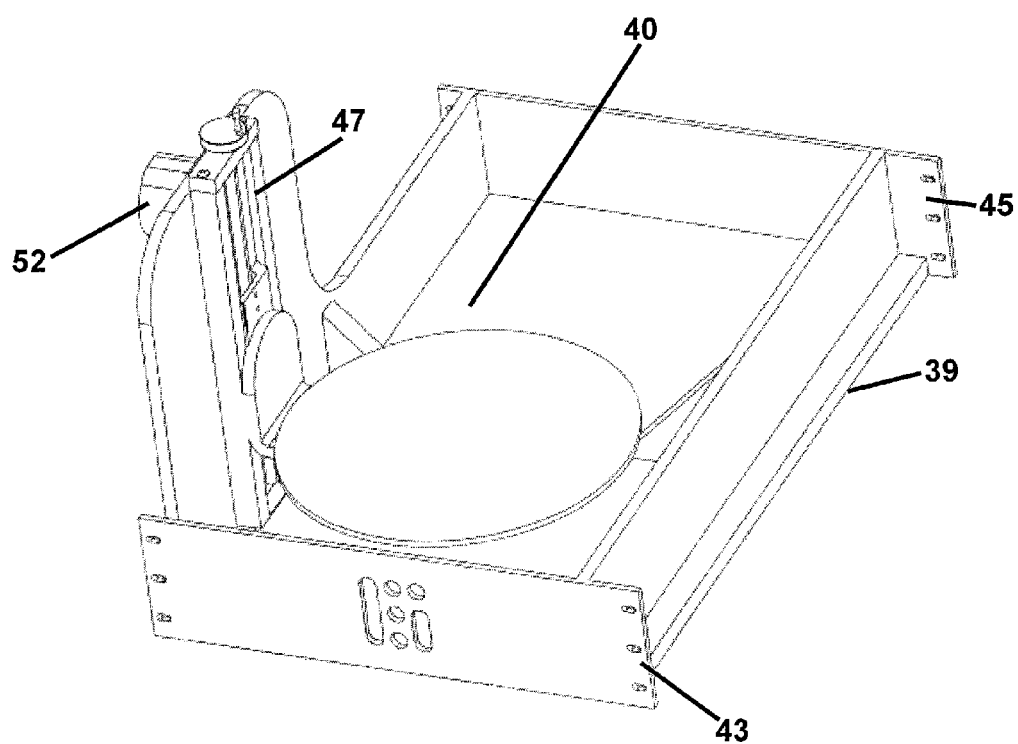
FIG. 3 is a perspective view of the parts presenter positioner assembly.
Figure 4:
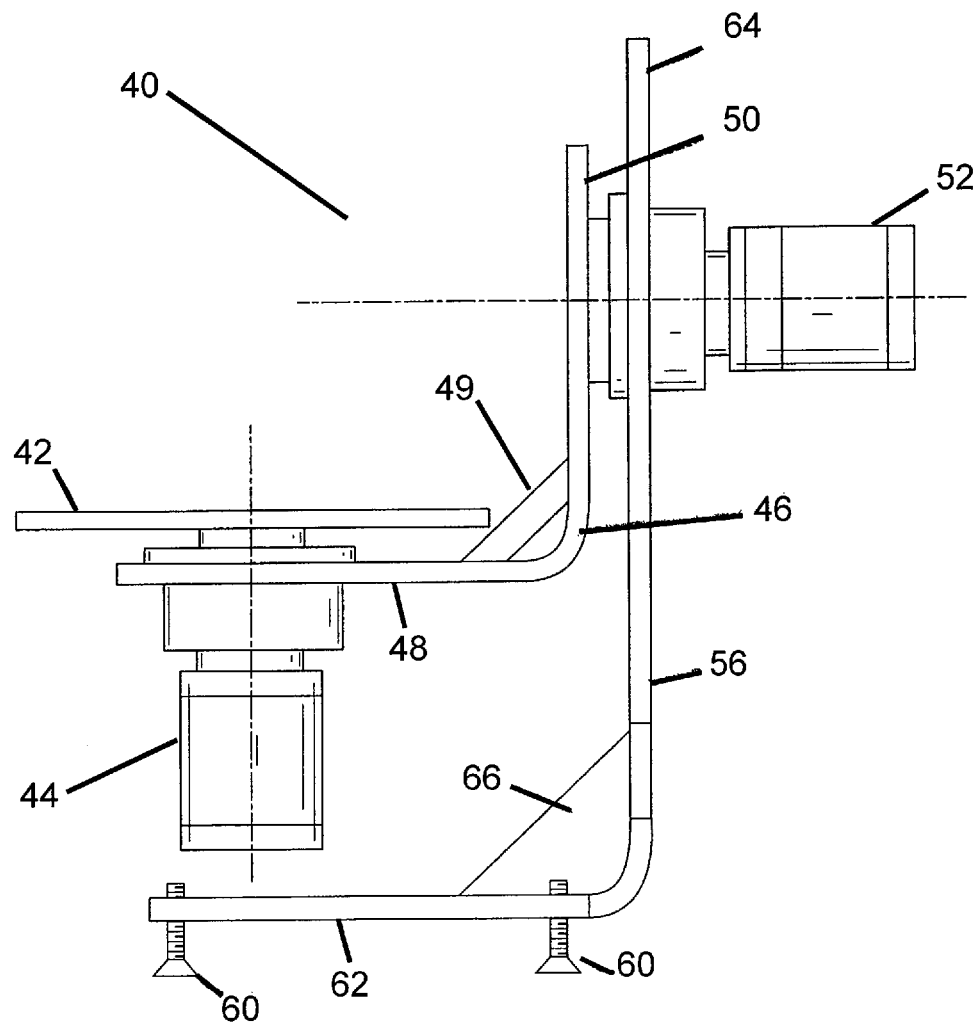
FIG. 4 is a side view of the parts presenter positioner.
Figure 5:
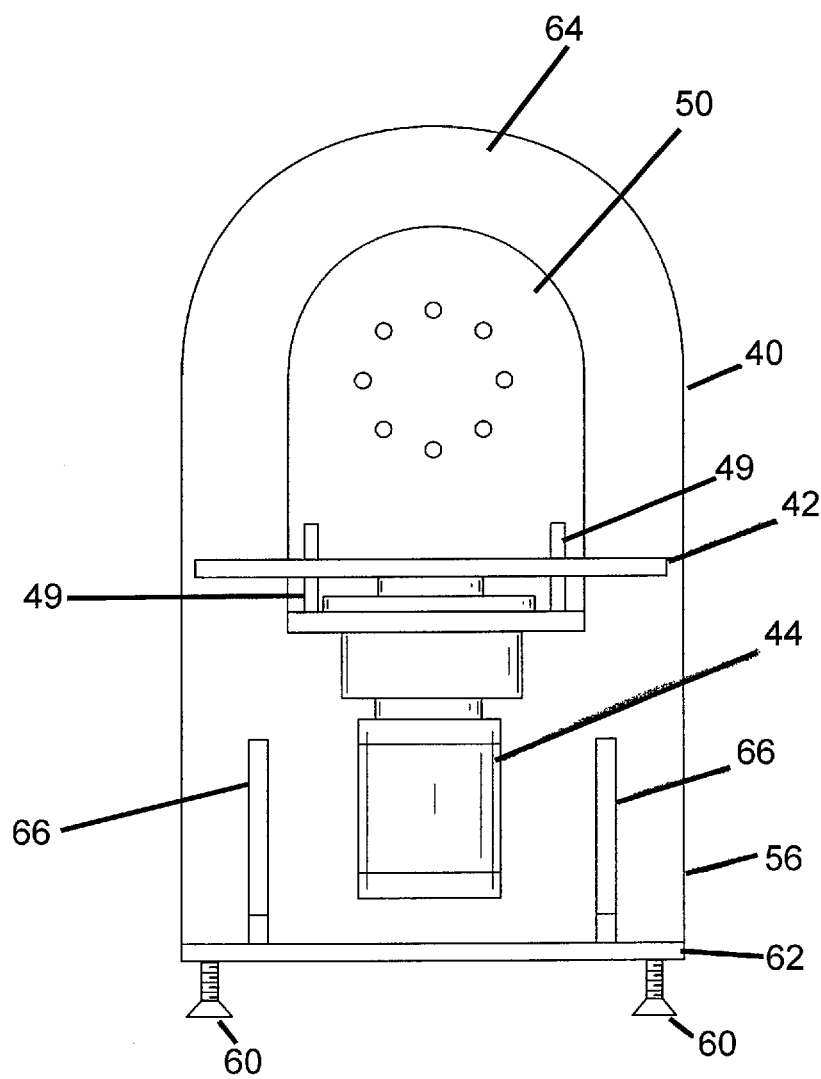
FIG. 5 is a front view of the parts presenter positioner.

Now referring to FIG. 3, the part presenter positioner 40 is shown in the rack 39, the rack having front 43 and rear 45 attachment walls. The parts presenter positioner includes a base 42 which operates as a parts gripper, the base. The gripper base 42 is capable of circular rotation by use of a first control motor, as will be illustrated in later drawings, forming a calibration artifact holder. The gripper base 42 can also be angled by use of a second control motor in response to commands issued through the computer. In addition, the gripper base 42 may be raised vertically along a track 47. FIGS. 4 and 5 further illustrate the parts presenter positioner wherein the gripper base 42 is shown secured to an L-shaped bracket 46 having a horizontal extension 48 and a vertical extension 50. A cross brace 49 is used to assure rigidity between the horizontal and vertical 50 extensions. The horizontal base 42 is rotatable coupled to the L-shaped bracket 46 by use of a first drive motor 44. The drive motor 44 causing rotation of the base in response to commands provided by the computer operation which can be an automatic rotation in response to preprogrammed commands. The second motor 52 is attached to an upper section 64 of a support base 56, the motor provides angular adjustment of the L-shaped bracket 46 which thereby adjusts the angle of the gripper base 42. The support base 56 includes a lower section 62 having coupling fasteners 60 for securing to the rack 49. To maintain rigidity between the upper section 64 and the lower section 62 the use of support brackets 66 permit the use of lightweight bracket material while maintaining a repeatable configuration.

The previously mentioned optical metrology scanner 70 is used to scan any part placed on the gripper base 42 for digitizing, performing dimensional analysis, inspection and report generation on the part scan. The parts presenter positioner 40 manipulates a part with rotational and tilting ability to make most every surface of the part available for scanning. Various gripping material, not shown, allows for the presentation and manipulation within a field of view of an optical metrology scanner, wherein the parts presenter positioner 40 is essentially a robotic arm having the presenter positioner forming a 2, 3 or 4 axis rotation and tilt and/or linear translation computer-controlled/integrated parts presenter positioner maneuverable with minimal or no human intervention. Personnel access can be limited by password or RFID access and can be integrated to work with current corporate RFID personnel badges or identification tags.

The inspection station provides an integrated automated 3D Optical Scanning and Computer Aided Inspection System and method for dimensional inspection of precision manufactured parts wherein the system provides a multi-axis presentation of a part, or multiple parts, in the part placement area with multi-axis parts presentation to the scanner provided by gripping and manipulating the part within a field of view of the optical metrology scanner, all of which is integrated, automated and computer-controlled. The computer is specifically designed to provide a very fast bus speed with parallel-processing, hyper-threading, multiple processors, including graphics processing units (GPU) when applicable, adequate data storage, and connection for the enterprise network and/or Internet, if desired. Upon scanning, the computer creates a scan file for individual or batch-processing, providing an analysis and an inspection and reporting operation on the part(s) to be analyzed. A pass/fail determination or a partial dimensional inspection report can be generated for sample testing large quantities, or a complete dimensional inspection report is generated for the parts or products as desired and programmed.

Figure 6:
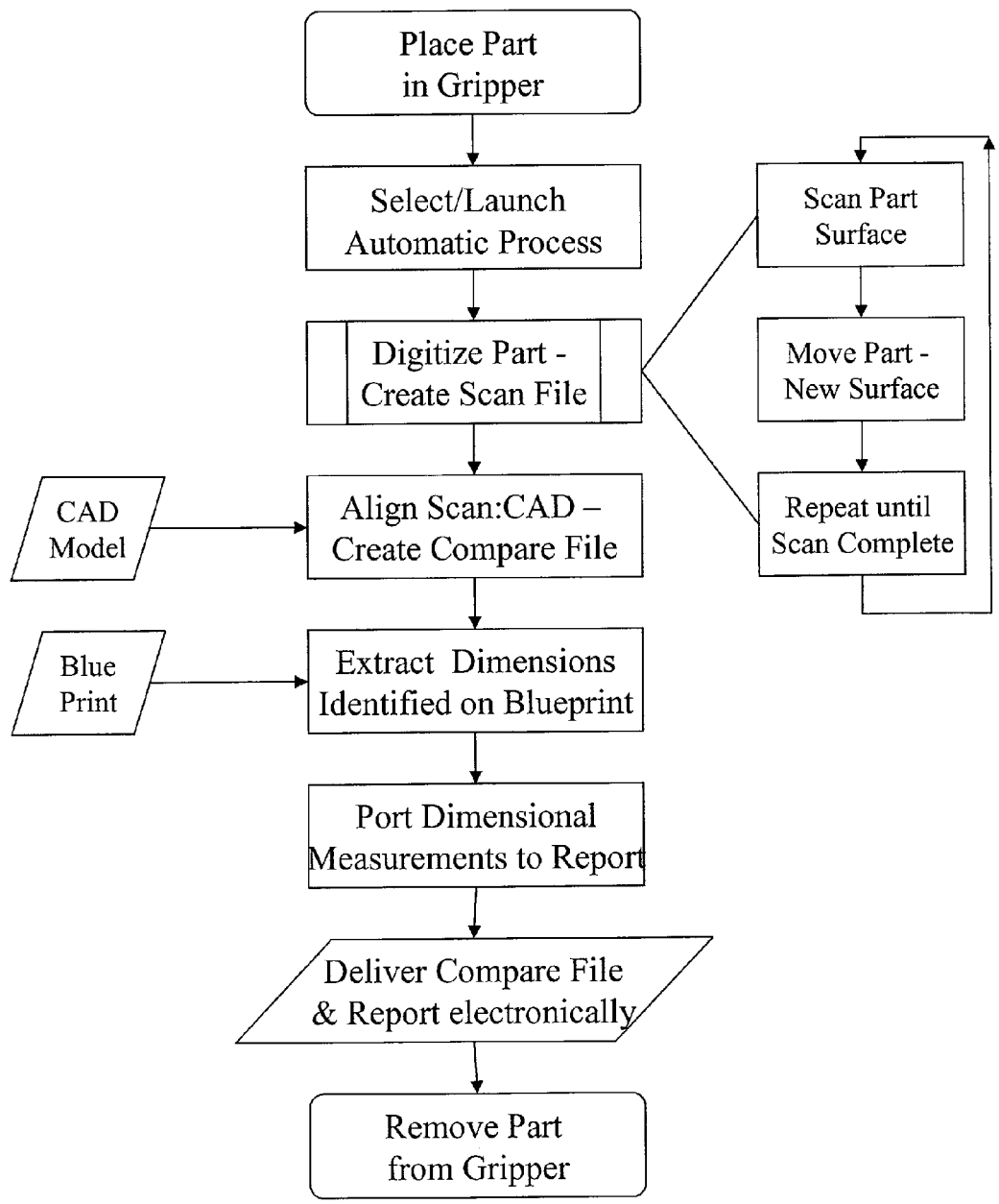
FIG. 6 is a flow schematic of the automated inspection station processes.

Referring in general to FIG. 6, the preferred method of scanning is as follows:

1. Mounting a scanner in a very stable and rigid case positioned above a part placement work envelope area;
2. Gripping the part to be inspected, or multiple parts to be inspected in the same Optical Scanner session;
3. Manipulating the part(s) in the gripper within the field of view below the Optical Scanner sensor on a multi-axis computer-controlled/integrated parts presenter positioner that makes most all of the part surface available for scanning with no or minimal human intervention;
4. Controlling by a computer having parallel-processing, hyper-threading, multiple processors, fast bus speed, large amounts of RAM, high-performance GPU, and substantial storage capacity, and the processing power to perform the Optical Scanner and part presenter positioner processes management at the same time as performing dimensional analysis, inspection and report generation on the (previous) part scan while scanning the next part;
5. Providing for scan file accumulation in a designated directory/folder for more efficient batch-processing in the inspection and analysis and reporting operation, either while Optical Scanner is being performed, or after a user-defined set of part scans have been created;
6. Including a calibration artifact holder for use on the parts presenter positioner and an integrated system calibration process routine for regular and on-demand use,
7. Including a complete library of previously developed inspection process setup files or inspection routines, which can also be developed on the system by trained process developers;
8. Providing a customizable operator/user interface devices of mouse and keyboard, or optionally touch screen with simplified operator interface, both requiring security login which allows access only to the inspection routines that the particular operator is authorized to perform;
9. Allowing for videoconferencing, online collaboration, remote access and operations with web cameras, telecom and web-based interactive sessions for any support need;
10. Placing all of components in a single strong industrial server-style cabinet, complete with an integrated UPS and optional air conditioner (if needed in the operating environment), with lockable doors allowing only authorized access to any particular part of the system, mounted on locking casters for system mobility around the facility with solid retractable support feet for cabinet stability and vibration dampening if needed, when situated for inspection operations, and the simplicity of a single power-plug for operations, plus Ethernet connection for data and report transfer and off-loading from the system;
11. Accounting for physical access for robotic/automated part placement into the part presenter positioner by another integrated system;
12. Configurable with variable or interchangeable components including sensors, field of view lenses, parts grippers, parts presenters, software applications, controllers and computers to allow multiple standard and custom system configurations to accommodate a reasonably wide range of part sizes, complexities, quantities, dimensional tolerances, scan data point density, inspection process speeds and analysis formats. Files can range from simple scan files, to pass/fail reports (even with green/red light indicators) through complete dimensional inspection reporting and integrating/delivering inspection output information directly into enterprise statistical process control (SPC) and enterprise/quality/production management systems.

While not shown, a calibration artifact can be used on the parts presenter positioner wherein an integrated system calibration process routine can be performed. Further, a library of previously developed inspection process setup files or inspection routines can be maintained to provide system flexibility for inspecting any parts which have a resident or accessible program. Connections to the inspection station allow for remote training, remote control, troubleshooting, training, video conferencing, and other online collaboration.

The Graphical User Interface and other software integration is achieved by an integral script that can placed within the chosen configuration software application and/or external to, or between, the chosen configuration software applications to tie them together for automated operations. The integration routines and programming can be modified to the various configurations of the Inspection Station.

An example of an integral script using Microsoft Excel is as follows:

```
WinActivate Microsoft Excel - wall_
Sleep 400
Send !e
Send c
Send {Down}
Sleep 150
WinActivate Microsoft Excel - 40171
Sleep 250
Send !e
Send p
Send {Right}
Send !e
Send p
Send {Down}{Left}
return
; Delete Line 1
WinActivate Microsoft Excel
Send ^{Home}
Send !e
Send d
Send r
Send {Enter}
; replace New with null
WinActivate Microsoft Excel
Send !E
Sleep 150
Send F
Sleep 250
Send !p
Sleep 250
Send !n
Sleep 400
Send ^a
SendRaw New
Sleep 250
Send !e
Sleep 250
Send
{End}{Backspace}{Backspace}{Backspace}{Backspace}{Backspace}
{Backspace}{Backspace}{Backspace}{Backspace}{Backspace}
{Backspace}{Backspace}{Backspace}{Backspace}
Sleep 250
Send !a
; get rid of find and replace
Sleep 600
Send {Enter}
WinActivate Find and Replace
Click 528,205
Sleep 500
; replace Model with null
WinActivate Microsoft Excel
Send !E
Sleep 150
Send F
Sleep 250
Send !p
Sleep 250
Send !n
Sleep 400
Send
{End}{Backspace}{Backspace}{Backspace}{Backspace}{Backspace}
{Backspace}{Backspace}{Backspace}{Backspace}{Backspace}
{Backspace}{Backspace}{Backspace}{Backspace}
SendRaw Model
Sleep 250
Send !e
Sleep 250
Send
{End}{Backspace}{Backspace}{Backspace}{Backspace}{Backspace}
{Backspace}{Backspace}{Backspace}{Backspace}{Backspace}
{Backspace}{Backspace}{Backspace}{Backspace}
Sleep 250
Send !a
; get rid of find and replace
Sleep 600
Send {Enter}
WinActivate Find and Replace
Click 528,205
Sleep 300
WinActivate Microsoft Excel
Send ^{Home}
```

-continued

```
; transpose Z -7.58
WinActivate Microsoft Excel
Send ^{Home}
Send {Down}{Down}{Right}{Right}{Right}
Sleep 300
Click 392,140
Sleep 150
Send {=}c3-7.58
Send {Enter}
Send {Up}
Sleep 250
Send !e
Send c
Click 326,169
Click 326,169
Click 326,169
Click 326,169
Sleep 150
Send !e
Sleep 150
Send p
Sleep 500
; copy column, paste special (values)
Send !e
Send c
Send {Right}
Send !e
Send s
Sleep 400
Send v
Send {Enter}
; delete columns
Send {Left}
Send !e
Send d
Send c
Send {Enter}
; delete columns
Send {Left}
Send !e
Send d
Send c
Send {Enter}
; get rid of -7.58
Send !E
Sleep 150
Send F
Sleep 250
Send !p
Sleep 250
Send !n
Sleep 400
Send ^a
SendRaw -7.58
Sleep 250
Send !e
Sleep 250
Send
{End}{Backspace}{Backspace}{Backspace}{Backspace}{Backspace}
{Backspace}{Backspace}{Backspace}{Backspace}{Backspace}
{Backspace}
Sleep 250
Send !a
; get rid of find and replace
Sleep 600
Send {Enter}
WinActivate Find and Replace
Click 528,205
; OLD BEGINNING
```

An example of an Airfoil Data Sample Macro script is as follows:

```
geo.Select_Objects 0, "TestObject", 0
geo.show_selection "Selection 1", 3, "Entire Model", 2
geo.cross_section "planar", 0.159883, -4.43284e-006, -0.987136,
-0.162349, 0, 0, 0, 0, 0, 0, 0.0165684, 0, false, 1, 0.000662686, 0,
```

```
false, 1, 0.000662686, "C-C", "spline", 10, "local", "tolerance",
0.000662686, 2.54e-006, 0.000132537, 20, 0, "auto", 0, false
geo.create_points "C-C", 0, 3.25191e-005, 1, 2400
geo.Select_Objects 0, "TestObject", 0
geo.cross_section "planar", 0.159885, -6.69481e-006, -0.987136,
-0.163227, 0, 0, 0, 0, 0, 0, 0.0165684, 0, false, 1, 0.000662686, 0,
false, 1, 0.000662686, "D-D", "spline", 10, "local", "tolerance",
0.000662686, 2.54e-006, 0.000132537, 20, 0, "auto", 0, false
geo.create_points "D-D", 0, 3.25191e-005, 1, 2400
geo.Select_Objects 0, "TestObject", 0
geo.cross_section "planar", 0.159887, -1.17748e-005, -0.987135,
-0.163854, 0, 0, 0, 0, 0, 0, 0.0165684, 0, false, 1, 0.000662686, 0,
false, 1, 0.000662686, "E-E", "spline", 10, "local", "tolerance",
0.000662686, 2.54e-006, 0.000132537, 20, 0, "auto", 0, false
geo.create_points "E-E", 0, 3.25191e-005, 1, 2400
geo.Select_Objects 0, "TestObject", 0
geo.cross_section "planar", 0.159878, 7.13755e-006, -0.987137,
-0.164481, 0, 0, 0, 0, 0, 0, 0.0165684, 0, false, 1, 0.000662686, 0,
false, 1, 0.000662686, "F-F", "spline", 10, "local", "tolerance",
0.000662686, 2.54e-006, 0.000132537, 20, 0, "auto", 0, false
geo.create_points "F-F", 0, 3.25191e-005, 1, 2400
geo.Select_Objects 0, "TestObject", 0
geo.cross_section "planar", 0.159881, -4.64901e-006, -0.987136,
-0.164982, 0, 0, 0, 0, 0, 0, 0.0165684, 0, false, 1, 0.000662686, 0,
false, 1, 0.000662686, "G-G", "spline", 10, "local", "tolerance",
0.000662686, 2.54e-006, 0.000132537, 20, 0, "auto", 0, false
geo.create_points "G-G", 0, 3.25191e-005, 1, 2400
geo.Select_Objects 0, "TestObject", 0
geo.cross_section "planar", 0.120138, -1.05604e-006, -0.992757,
-0.166426, 0, 0, 0, 0, 0, 0, 0.0165684, 0, false, 1, 0.000662686, 0,
false, 1, 0.000662686, "H-H", "spline", 10, "local", "tolerance",
0.000662686, 2.54e-006, 0.000132537, 20, 0, "auto", 0, false
geo.create_points "H-H", 0, 3.25191e-005, 1, 2400
geo.Select_Objects 0, "TestObject", 0
geo.cross_section "planar", 0.0801971, 3.75431e-006, -0.996779,
-0.167606, 0, 0, 0, 0, 0, 0, 0.0165684, 0, false, 1, 0.000662686, 0,
false, 1, 0.000662686, "J-J", "spline", 10, "local", "tolerance",
0.000662686, 2.54e-006, 0.000132537, 20, 0, "auto", 0, false
geo.create_points "J-J", 0, 3.25191e-005, 1, 2400
geo.Select_Objects 0, "TestObject", 0
geo.cross_section "planar", 0, 0, -1, -0.16891, 0, 0, 0, 0, 0, 0,
0.0165684, 0, false, 1, 0.000662686, 0, false, 1, 0.000662686, "K-K",
"spline", 10, "local", "tolerance", 0.000662686, 2.54e-006,
0.000132537, 20, 0, "auto", 0, false
geo.create_points "K-K", 0, 3.25191e-005, 1, 2400
geo.Select_Objects 0, "TestObject", 0
geo.cross_section "planar", 0, 0, -1, -0.170434, 0, 0, 0, 0, 0, 0,
0.0165684, 0, false, 1, 0.000662686, 0, false, 1, 0.000662686, "L-L",
"spline", 10, "local", "tolerance", 0.000662686, 2.54e-006,
0.000132537, 20, 0, "auto", 0, false
geo.create_points "L-L", 0, 3.25191e-005, 1, 2400
geo.Select_Objects 0, "TestObject", 0
geo.cross_section "planar", 0, 0, -1, -0.173101, 0, 0, 0, 0, 0, 0,
0.0165684, 0, false, 1, 0.000662686, 0, false, 1, 0.000662686, "M-M",
"spline", 10, "local", "tolerance", 0.000662686, 2.54e-006,
0.000132537, 20, 0, "auto", 0, false
geo.create_points "M-M", 0, 2.83466e-005, 1, 2400
geo.Select_Objects 0, "TestObject", 0
geo.cross_section "planar", 0, 0, -1, -0.175895, 0, 0, 0, 0, 0, 0,
0.0165684, 0, false, 1, 0.000662686, 0, false, 1, 0.000662686, "N-N",
"spline", 10, "local", "tolerance", 0.000662686, 2.54e-006,
0.000132537, 20, 0, "auto", 0, false
geo.create_points "N-N", 0, 3.25191e-005, 1, 2400
geo.Select_Objects 0, "TestObject", 0
geo.cross_section "planar", 0, 0, -1, -0.178689, 0, 0, 0, 0, 0, 0,
0.0165684, 0, false, 1, 0.000662686, 0, false, 1, 0.000662686, "P-P",
"spline", 10, "local", "tolerance", 0.000662686, 2.54e-006,
0.000132537, 20, 0, "auto", 0, false
geo.create_points "P-P", 0, 3.25191e-005, 1, 2400
geo.Select_Objects 0, "TestObject", 0
geo.cross_section "planar", 0, 0, -1, -0.181483, 0, 0, 0, 0, 0, 0,
0.0165684, 0, false, 1, 0.000662686, 0, false, 1, 0.000662686, "R-R",
"spline", 10, "local", "tolerance", 0.000662686, 2.54e-006,
0.000132537, 20, 0, "auto", 0, false
geo.create_points "R-R", 0, 3.25191e-005, 1, 2400
geo.Select_Objects 0, "TestObject", 0
geo.cross_section "planar", 0, 0, -1, -0.18415, 0, 0, 0, 0, 0, 0,
0.0165684, 0, false, 1, 0.000662686, 0, false, 1, 0.000662686, "S-S",
"spline", 10, "local", "tolerance", 0.000662686, 2.54e-006,
0.000132537, 20, 0, "auto", 0, false
geo.create_points "S-S", 0, 3.25191e-005, 1, 2400
geo.Select_Objects 0, "TestObject", 0
geo.cross_section "planar", 0, 0, -1, -0.18669, 0, 0, 0, 0, 0, 0,
0.0165684, 0, false, 1, 0.000662686, 0, false, 1, 0.000662686, "T-T",
"spline", 10, "local", "tolerance", 0.000662686, 2.54e-006,
0.000132537, 20, 0, "auto", 0, false
geo.create_points "T-T", 0, 3.25191e-005, 1, 2400
geo.Select_Objects 1, "Point", 15, "C-C", "D-D", "E-E", "F-F", "G-G",
"H-H", "J-J", "K-K", "L-L", "M-M", "N-N", "P-P", "R-R", "S-S", "T-T"
geo.create_group "Airfoil 1"
geo.Select_Objects 0, "TestObject", 0
geo.exact_position 0, 0, 0, -3.2727, 0, 0, 1, 0, 0, 1
geo.clear_all
```

The script is repeatable throughout the scanning cycle providing automatic rotation and tilting of the part until completely scanned. The scanner is capable of picking up tens of thousands of data points per second, and the scripting provides a highly automated process that ensures consistency and quality. Upon completion, the three-dimensional digital model is then compared to the object's original CAD model and any geometric variation between the two is vividly shown in "color plots" with adjustable tolerance ranges as well as complete tables of measurements and deviations. The increased ease of interpretation and understanding from these color plot reports is one of the key advantages of this method of geometric measurement and quality analysis. This process enables quick and accurate product inspection, such as prior to production implementation, or after periods of extended use and/or product remanufacture and so on. A comparative analysis of the CAD model to the actual product permits identification of imperfections. In addition, because optical metrology three-dimensional scanning is a nondestructive analysis that encompasses the entire object, it is possible to reverse engineer the object based on the data collected during the scanning process. This allows the remanufacture of parts for which there is no CAD data.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An Inspection System comprising:
   a portable cabinet defined by a frame having retractable vibration isolated support feet and an air conditioned interior area formed from upright walls spaced apart and constructed to hold rack mounted component wherein the portable cabinet provides an interior space having a controlled environment to prevent thermal expansion from heat, humidity and eliminate measurement error from varying environmental light sources;
   a computer positioned within said cabinet, said computer capable of data storage and parallel-processing with hyper-threading through multiple processors at a high bus speed;
   a display screen positioned within said cabinet and coupled to said computer through a graphical processing unit;
   a part presenter positioner mounted within said cabinet and electrically coupled to said computer, said part presenter positioner available for rotational, linear, and angular positioning in response to commands from said computer from an integrated library script, wherein said part presenter positioner includes a base for use in securing the part, said base movable through a field of view of said scanner by motors secured to said base allowing multi-axis manipulation under automated computer control;
   an optical digital 3D camera/scanner positioned above said part presenter positioner, said optical camera/scanner having a structured light source used to project a controlled fringe or raster patterns on the part, said fringe or raster patterns recorded as high resolution images with said digital 3D camera, said computer controlling said part presenter positioner for automated rotational and angular positioning to accurately complete a three dimensional digital scan file of the part being inspected;
   wherein said optical camera/scanner digitizes desired surfaces of a part positioned on said part presenter positioner to produce a 3D scan file wherein scans are merged together using positional information to make a final consolidated 3D scan file, said digital 3D scan file is automatically compared to a nominal CAD model of the part to permit geometric analysis, complete dimensional inspection and full dimensional inspection reporting operation on the part to be inspected, including porting the dimensional inspection results into Statistical Process Control databases.

2. The Inspection System according to claim 1 wherein optical camera/scanner is a 3D optical metrology scanner.

3. The Inspection System according to claim 1 wherein said geometric variation between the part and an original CAD image is shown in dynamic and static color plots illustrating geometric conformance and deviation of the part to the nominal CAD model with adjustable tolerance ranges.

4. The Inspection System according to claim 1 wherein said part presenter positioner is mounted into said cabinet as a module.

5. A method for full and complete dimensional inspection of precision manufactured parts comprising the steps of:
   constructing a portable cabinet defined by a frame having retractable vibration isolated support feet and an air conditioned interior area formed from upright walls spaced apart and constructed to hold rack mounted component wherein the portable cabinet provides an interior space having a controlled environment to prevent thermal expansion from external heat, humidity and eliminate measurement error from varying environmental light sources wherein having a part placement area having a optical metrology scanner positioned above a part presenter positioner capable of multi-axis presentation of a part, said cabinet including a controller having a fast bus speed computer with parallel-processing, hyper-threading, multiple processors, CPU and GPU and data storage, said controller operating said optical metrology scanner for digitization of the surface of the part for dimensional analysis, inspection and report operation;
   a portable cabinet defined by a frame having retractable vibration isolated support feet and an air conditioned interior area formed from upright walls spaced apart and constructed to hold rack mounted component wherein the portable cabinet provides an interior space having a controlled environment to prevent thermal expansion from external light, heat, and humidity;
   positioning a part in need of inspection in said part presenter positioner;
   positioning the part with a multi-axis presentation provided by manipulating the part within a field of view of said optical metrology scanner through multi-axis controlled motion;
   scanning an image of the part at predetermined positions provided through said multi-axis controlled motion;
   creating a scan file for said image, said image directed through comprehensive individual or multiple batch-processing to provide a thorough inspection and reporting operation on the part;
   dimensional comparison of said 3D scan file where geometric conformance/deviation is determined and displayed, plus dimensional extraction of any or all prescribed dimensions indicated in the part and blueprint are automatically analyzed, inspected and reported;
   providing a dimensional inspection report for traceability, trackability, and trendability of the inspected parts,
   whereby said optical camera/scanner digitizes desired surfaces of a part positioned on said part presenter positioned to produce a 3D scan file wherein scans are merged together using positional information to make a final consolidated 3D scan file, said digital scan file is compared to an original CAD model of the part to permit geometric analysis and perform a fully automated analysis, inspection and reporting operation on the part to be inspected.

6. The method for dimensional inspection of precision manufactured parts according to claim 5 including the step of providing a calibration artifact holder for use on said part presenter positioner and an integrated system calibration process routine for regular and on-demand use.

7. The method for dimensional inspection of precision manufactured parts according to claim 5 including the step of providing a library script of previously-developed inspection process setup files or inspection routines for automation of the inspection process.

8. The method for dimensional inspection of precision manufactured parts according to claim 7 wherein said library script can be developed on the system through trained process development, or offline on separate systems for transfer into the library script of process setup files.

9. The method for dimensional inspection of precision manufactured parts according to claim 5 including the step of providing customizable operator/user interface devices by use of a bar code scanner, name tag, or badge security.

10. The method for dimensional inspection of precision manufactured parts according to claim 5 wherein said display allows video conferencing and online collaboration, or even remote operational control, training, and troubleshooting.

11. The method for dimensional inspection of precision manufactured parts according to claim 5 wherein said parts presenter positioner is further defined as a computer controlled robotic arm for manipulation of the part through the 3D scanner's field of view.

12. The method for dimensional inspection of precision manufactured parts according to claim 5 wherein said the comparison of original CAD model of the part to the inspected part results in a pass/fail determination.

13. The method for dimensional inspection of precision manufactured parts according to claim 5 wherein said the comparison of 3D scan file to the nominal CAD model of the part, and the analysis and inspection of the part is automatically performed dimensional data ported directly into Statistical Process Control database systems.

\* \* \* \* \*